United States Patent
Filippa et al.

(10) Patent No.: US 8,035,332 B2
(45) Date of Patent: Oct. 11, 2011

(54) MOTOR APPARATUS AND METHOD

(75) Inventors: Mariano Filippa, Louisville, KY (US); Edward Hatfield, Louisville, KY (US); Richard D. Suel, II, Louisville, KY (US); John Steven Holmes, Sellersburg, IN (US)

(73) Assignee: General Electric Company, Schenectady, NY (US)

( * ) Notice: Subject to any disclaimer, the term of this patent is extended or adjusted under 35 U.S.C. 154(b) by 896 days.

(21) Appl. No.: 11/931,620

(22) Filed: Oct. 31, 2007

(65) Prior Publication Data

US 2009/0106912 A1    Apr. 30, 2009

(51) Int. Cl.
H02P 3/18    (2006.01)
(52) U.S. Cl. .......................... 318/757; 68/12.16; 8/158
(58) Field of Classification Search ........... 318/757–765
See application file for complete search history.

(56) References Cited

U.S. PATENT DOCUMENTS

| | | |
|---|---|---|
| 4,328,600 A | 5/1982 | Bochan |
| 4,329,630 A | 5/1982 | Park |
| 4,390,826 A | 6/1983 | Erdman et al. |
| 4,449,079 A | 5/1984 | Erdman |
| 4,474,038 A | 10/1984 | McMillan |
| 4,513,230 A | 4/1985 | Erdman |
| 4,532,459 A | 7/1985 | Erdman et al. |
| 4,556,827 A | 12/1985 | Erdman |
| 4,741,182 A | 5/1988 | Didier et al. |
| 4,853,605 A | 8/1989 | Matsuo et al. |
| 5,247,231 A | 9/1993 | Glucina |
| 5,301,523 A | 4/1994 | Payne et al. |
| 5,513,058 A | 4/1996 | Hollenbeck |
| 5,720,190 A | 2/1998 | Johnson et al. |
| 5,731,681 A * | 3/1998 | Inaniwa et al. ............. 318/729 |
| 5,913,592 A | 6/1999 | Moore |
| 6,038,724 A | 3/2000 | Chbat et al. |
| 6,369,538 B1 | 4/2002 | Youn et al. |
| 6,418,758 B1 * | 7/2002 | Ikeda et al. ................. 68/12.06 |
| 6,429,612 B1 * | 8/2002 | Kume et al. ................. 318/139 |
| 6,445,879 B1 | 9/2002 | Youn et al. |
| 6,516,485 B1 | 2/2003 | Savkar et al. |
| 6,737,828 B2 | 5/2004 | Kiuchi et al. |
| 6,748,618 B1 | 6/2004 | Darby et al. |
| 6,860,124 B1 | 3/2005 | Abi-Habib et al. |
| 6,983,657 B1 | 1/2006 | Kakutani et al. |
| 7,039,976 B2 | 5/2006 | Sears |
| 7,089,800 B2 | 8/2006 | Kakutani et al. |
| 2006/0242768 A1 | 11/2006 | Zhang et al. |
| 2006/0283211 A1 | 12/2006 | Bindocci et al. |

\* cited by examiner

*Primary Examiner* — Michael Barr
*Assistant Examiner* — David Cormier
(74) *Attorney, Agent, or Firm* — Global Patent Operation; Stephen G. Midgley

(57) ABSTRACT

A method of operating a motor, the method comprising: operating a motor at a first speed; operating the motor in negative slip; imbalancing at least one phase of the motor to dissipate regeneration energy using windings of the motor; and wherein a next motor speed is decreased to a speed less than the first speed. An apparatus for carrying out the method is also presented.

7 Claims, 10 Drawing Sheets

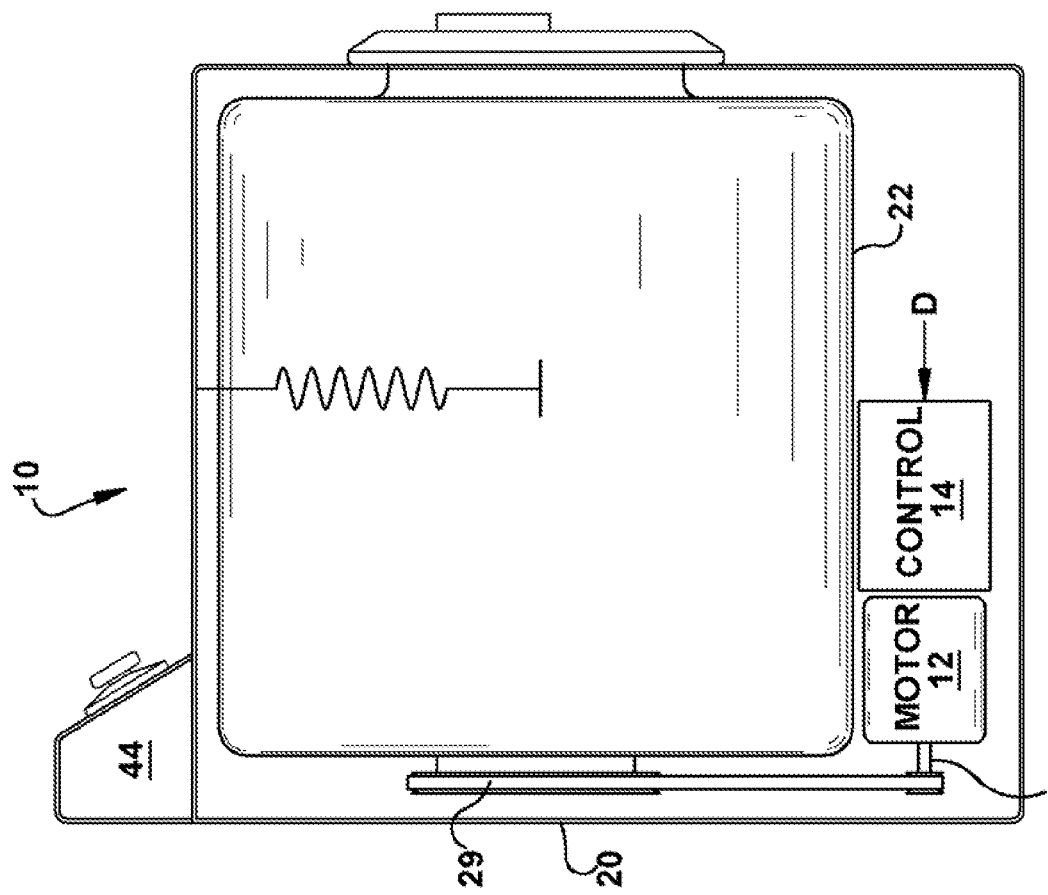
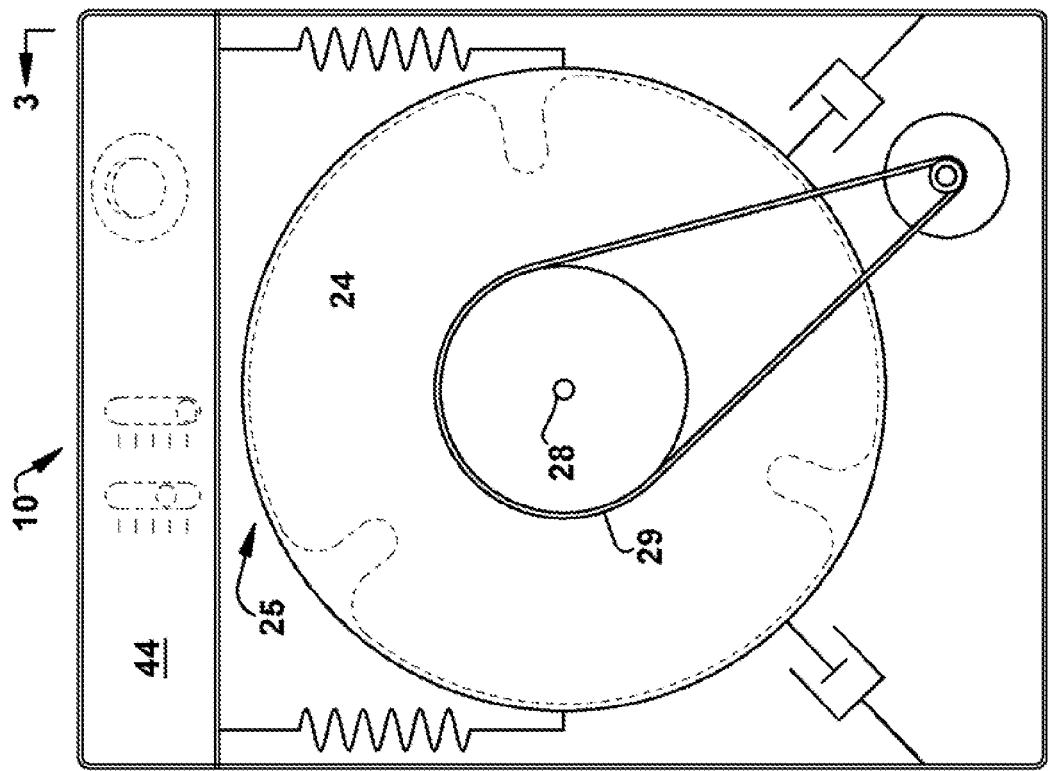

MOTOR APPARATUS AND METHOD

BACKGROUND OF THE INVENTION

1. Field of the Invention

The present disclosure is related to a rotating container. More particularly, the present disclosure is related to the braking of a tub or basket that is subject to a rotational speed.

2. Description of Related Art

Vertical axis washing machines, also known as top loading washing machines, represent a large portion of the overall washing machine consumer market in the United States. Horizontal axis washing machines represent a smaller segment of the United States market and abroad typically represent a larger portion of the overall washing machine consumer market.

Most vertical axis and horizontal washing machines include a spin cycle for removing water and/or detergents from the laundry using centrifugal force and spinning a wash load tub, also referred to as a laundry tub ("tub") or basket. During a typical spin cycle, the motor, typically an induction motor, of the washing machine spins the tub at relatively high speed(s).

Historically induction motors used in washers have been single phase induction motors or PSC induction motors. More recently three-phase induction motors, have been used in some commercially available washers. The three-phase motors in washers for home use are typically powered by standard single phase AC household electric power. As part of a three-phase induction motor washing machine, a circuit associated with the motor converts the single phase AC household electric power to three phase power; the three phase power is better at motor starting and operates more efficiently than single phase power.

A simplified explanation of an induction motor, ignoring losses follows: The induction motor has a rotor with a short-circuited winding inside a stator with a rotating magnetic field. The flux from the rotating field induces a current flow in the rotor. The frequency of the current flowing is equal to the difference between the rotational speed of the stator field and the rotational speed of the rotor. This difference in speed, or frequency, of the stator magnetic field and the rotor magnetic field is known as the slip.

The rotor current causes a rotor magnetic field, which is spinning relative to the rotor at the slip frequency and relative to the stator field, at the same slip frequency. The interaction between rotor magnetic field and the stator magnetic field generates a torque in the rotor.

A wash load wash cycle has various modes such as fill, drain and spin, agitation, and spin. Braking can occur before, during or after various segments of the wash cycle. Braking can be dictated by wash cycle parameters and also by safety standards, such as UL safety standards. Typical intermittent wash load braking during the spin mode of the wash cycle is performed in accordance with UL safety standards. For example, if a lid, such as the lid of a vertical washing machine, is opened during the spin modes or cycle, the wash load brakes within a predetermined time limit, such as a 7 second stop-time that is a UL safety standard. Other safety standards and/or stop times may also be available for safety purposes during various modes of the wash cycle.

Some prior art washing machines or washers typically rely upon mechanical brakes such as brake pads or shoes to bring a rotating load, such as a washing machine tub, to zero speed or zero angular velocity in a clothes washer.

The use of brake pads or shoes to stop a washing machine tub is costly and also affects the life of the washing machine dependent upon use since each brake shoe or pad has a wear surface that is subject to wear and eventually, after a period of use, will fail due to wear. Hence there is a wide variation in life of a washer model configured with brake pads or shoes, depending upon subjective factors, i.e. the user or consumer's use of the washing machine including frequency of use and type of use. The type of use varies in the selection of cycle such as a gentle cycle or a heavy-duty cycle. The braking of spin associated with a gentle cycle likely causes less brake wear than the braking of spin associated with a heavy-duty cycle. There are also variations in braking dependent upon the load size or water level used. A large load may spin longer and at greater angular velocity than a small load; thus causing greater wear on the brake. A higher water level, using more water than a lower level, less full load, would also require additional spin for water removal and could cause greater wear on the brake.

Other prior art washing machines or washers use permanent magnet motors and control circuits to provide braking to the washer without using a brake pad or shoe applied to the washer tub to bring the rotating load to zero speed or zero angular velocity. Generally a permanent magnet motor operates like a generator when braking; typical excess electrical energy from the generator mode is either dissipated via a brake resistor or a power resistor controlled appropriately or it is sent out to the electrical system using, for example, the line synchronization technique.

Accordingly, there is a need for a washing machine that overcomes, alleviates, and/or mitigates one or more of the aforementioned and other deleterious effects of prior art washing machines.

BRIEF SUMMARY OF THE INVENTION

A exemplary embodiment of the present invention includes a washing machine with an induction motor and a motor control circuit with a feedback loop. The feedback loop provides rotor speed to a microprocessor of the motor control circuit. The motor control circuit and feedback loop control the motor such that the motor operates in a negative slip mode with phase imbalance which causes the motor to dissipate excess regenerated energy rather than pass it back to the inverter.

An exemplary method of the present invention provides for operating a motor, the method comprising: includes operating a motor at a first speed; operating the motor in negative slip; imbalancing at least one phase of the motor to dissipate regeneration energy using windings of the motor; wherein a next motor speed is decreased to a speed less than the first speed.

Another exemplary embodiment of the present invention is a washing machine. The washing machine has a rotatable tub; the washing machine includes a motor comprising a three-phase power input and a motor feedback control circuit, the motor operatively connected to the rotatable tub of the washing machine for rotation and braking operations; the motor feedback control circuit comprising a microprocessor and an inverter; the microprocessor comprising a proportional integral controller, the microprocessor configured to receive operating speed from the motor feedback control circuit and to provide voltage output instructions to the inverter; the proportional integral controller comprising an input and an output, the microprocessor providing an input value to the PI input, the PI output outputting an output value to the microprocessor for a determination of at least one braking operation to implement by the washing machine; and the inverter configured to the receive voltage output instruction from the microprocessor and provide voltage output to the motor three-phase power input according to the voltage output instructions and cause the motor to operate in the at least one braking operation determined by the microprocessor from the output value of the proportional integral controller. The washing machine operates wherein if the output value is greater than a negative maximum offset value and less than zero, the microprocessor instructs the inverter to provide the three-phase power input of the motor with input voltage for DC offset braking operation; and wherein if the output value is not greater than a negative maximum offset value and is less than zero, the microprocessor instructs the inverter to provide the three-phase power input of the motor with input voltage for a DC offset braking operation.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

Further, the purpose of the foregoing Paragraph Titles used in both the background and the detailed description is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Paragraph Titles are neither intended to define the invention or the application, which only is measured by the claims, nor are they it intended to be limiting as to the scope of the invention in any way.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 2 illustrates a cross sectional view of various elements of the exemplary horizontal axis washer of the present invention;

FIG. 3 illustrates a side view of the exemplary washer of the present invention along lines 2-2 of the cross sectional view of FIG. 2;

DETAILED DESCRIPTION OF THE INVENTION

Washing Machine Introduction

Figure 1:
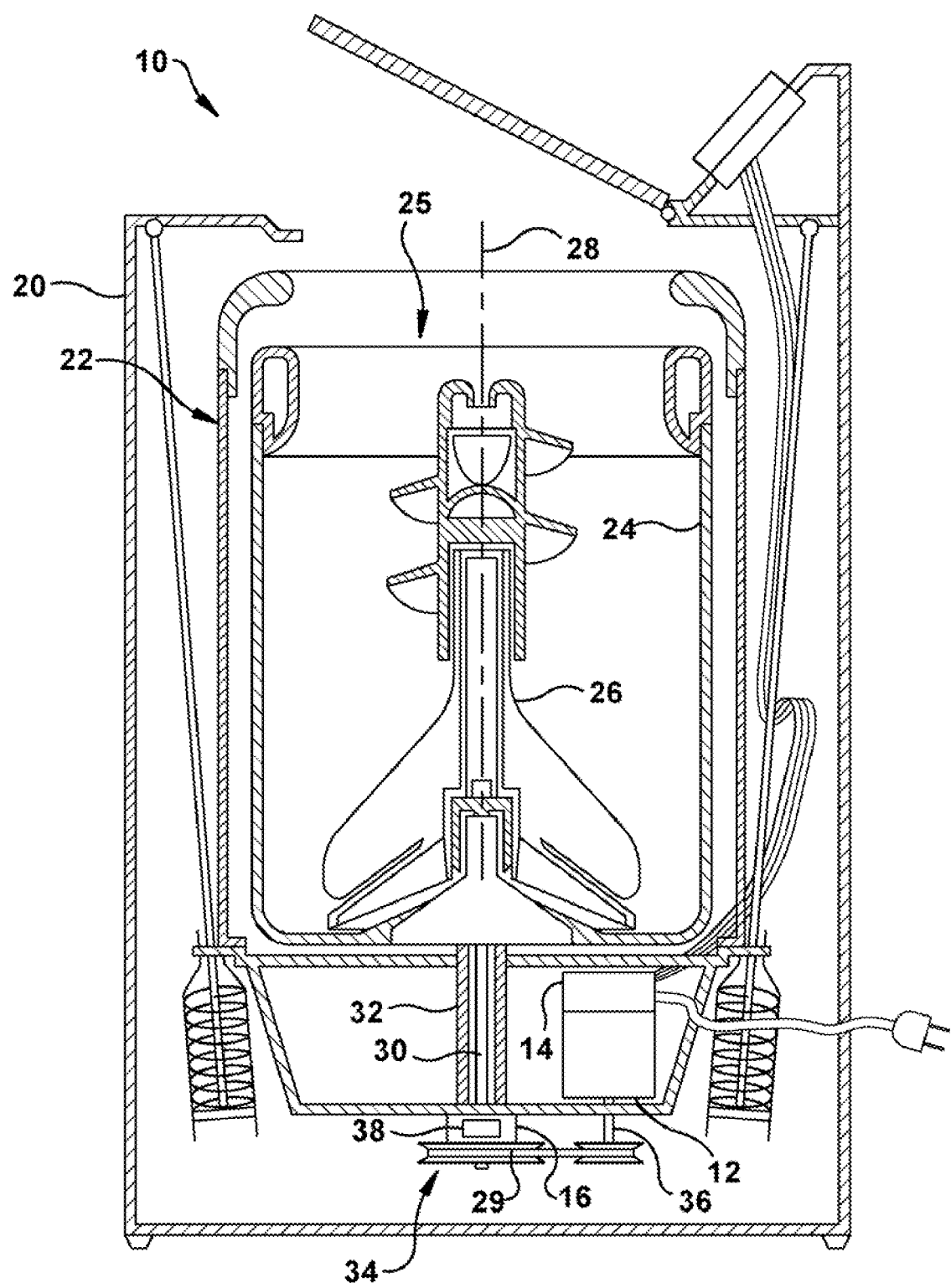
FIG. 1 is a sectional view of a vertical axis washing machine according to an exemplary embodiment of the present invention.

Referring to the drawings and in particular to FIG. 1, a washing machine ("washer") according to an exemplary embodiment of the present invention is illustrated and is generally referred to by reference numeral 10. For purposes of clarity, aspects of washer 10 necessary for understanding of the present disclosure, as well as aspects helpful in understanding the operation of washer 10 are described herein. Washer 10 described herein can be a vertical axis washer 10 as is illustrated in FIG. 1 or a horizontal axis washer 10, as is illustrated in FIGS. 2 and 3. One of ordinary skill in the art can perform the exemplary embodiments of the invention described herein using either configuration. Like reference numerals are used in the horizontal and vertical axis washer illustrations.

Washer 10 includes a motor 12 and a motor control unit 14. Motor 12 is a three-phase alternating current (AC) induction motor and, in some embodiments includes motor control unit 14 integral therewith. The motor control, integral therewith is referred to herein as integrated control and motor (ICM) or control circuitry. Motor control unit 14 can include circuitry customized for an exemplary embodiment of the present invention. Alternately a motor control circuit that is supplied independently of the motor could be used as can be determined by one of ordinary skill in the art. For purposes of illustration, the independent control circuit 14 is in the same block diagram configuration as the integrated motor control circuit 14 and therefore, not separately illustrated. The washer 10 is provided with input power such as single phase AC power input 48, illustrated in FIG. 4.

Washer 10 includes an outer housing or cabinet 20 supporting a fixed tub 22, a basket or moving tub ("tub") 25, an agitator 26, motor 12, and motor control unit 14 in a known manner. Agitator and basket drive shafts 30, 32 are also illustrated. Basket 25 is configured to hold articles (not shown) such as clothes to be washed. Circuit 14 is configured so that it causes the circuit 14 to control the motor in a manner that results in motor operation where imbalance of at least one phase of the motor dissipates regeneration energy using windings of the motor. The control circuit may also include a counter C and memory 56 for storage of load size data and other appropriate data as may be determined by one of ordinary skill in the art.

During a spin cycle, basket 25 and agitator 26 are configured to be driven by motor 12 via motor drive shaft coupled to drive belt 29 to rotate at a high speed about axis 28. In this manner, liquid within the articles is removed by the centrifugal force imparted by the spin cycle and is allowed to exit the basket through openings (not shown). However, during a washing cycle, agitator 26 is configured to be driven by motor 12 to rotate back-and-forth about axis 28 so that the clothes in the basket are agitated. For example, agitator 26 is secured to an agitator drive shaft 30 and basket 25 is secured to a basket drive shaft 32. Motor 12 is coupled to mode shifter 16 by a transmission 34. In the vertical washer configuration of FIG. 1, transmission 34 is configured to transmit rotary motion imparted on a motor shaft 36 by motor 12 to mode shifter 16 via drive belt 29. In the horizontal washer configuration of FIG. 2, a direct belt drive is configured to transmit rotary motion imparted on a motor shaft 36 by motor 12 to tub 25 via drive belt 29. FIG. 3 illustrates a side view of the exemplary washer of the present invention along lines 2-2 of the cross sectional view of FIG. 2.

During a spin cycle, basket 25 and agitator 26 are configured to be driven by motor 12 to rotate at a high speed about axis 28. In this manner, liquid within the articles is removed by the centrifugal force imparted by the spin cycle and is allowed to exit the basket through openings (not shown). During the spin cycle, basket 25 has an inertial load comprising the inertial load from the articles and inertial load inherent to the basket 25. During spin cycle articles or clothing becomes plastered to the wall of basket 25 at a first speed or plaster speed. Plaster refers to the centrifugal force of the spin cycle pushing the clothing against the wall or structure of the basket. The clothes remain positioned by centrifugal force during a time period the first speed or plaster speed to a second speed or maximum speed of the spinning basket. The plastered speed and maximum speed can be determined by one of ordinary skill in the art.

The exemplary electronic control circuits of the present invention include components such as a microprocessor 61 (see FIG. 4) that can be programmed using a programming language such as C, C++ or assembly language. Alternately the microprocessor could be an application specific integrated circuit (ASIC). The type of microprocessor used in the control circuit could be determined by one of ordinary skill in the art.

Figure 4:
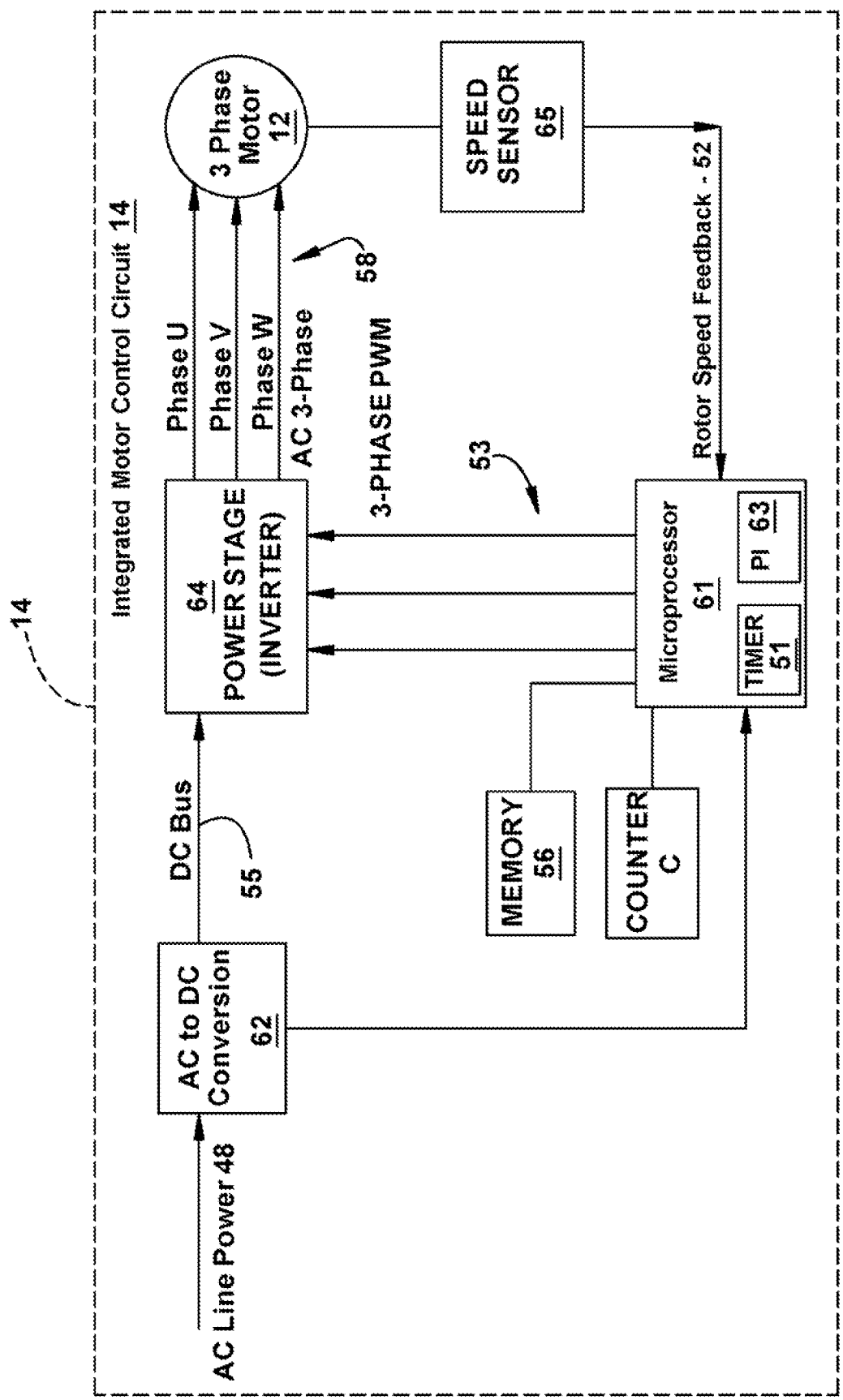
FIG. 4 illustrates a functional block diagram of an exemplary embodiment of the washer of the present invention.

Another component illustrated in the examples of the present invention is an AC to DC converter component 62 for converting single phase input power, such as conventional residential voltage of 110 v, 60 Hz in the US, to DC voltage. Additionally, there is a microprocessor 61 which drives the power stage 64 (inverter) appropriately to convert the DC voltage into three-phase AC, typically by pulse-width modulation (PWM). The choice of components in the power stage can be determined by one of ordinary skill in the art. For example, the power stage could comprise IGBTs (not shown) and Gate Drivers (not shown). The output of exemplary inverter 64 is three-phase voltage labeled phases U, V and W. One of ordinary skill in the art would be familiar with the U, V and W phase nomenclature, while others may be familiar with typical/similar phase A, phase B and phase C nomenclature (not shown). Phases U, V and W are illustrated in FIG. 4. The output voltage of the inverter 64 is input voltage 57 to the three-phase induction motor 12 that is the exemplary motor for the embodiments of the invention described herein.

Closed Loop Technique. The closed loop motor control circuit configuration uses available feedback including motor speed and DC bus (aka bulk) voltage 55. The control circuit 14 adjusts output frequency and amplitude of voltage 57 to the motor 12 to achieve and maintain a desired speed level. The exemplary closed loop motor control circuit configuration of the present invention is used to provide washing machine 10 motor operation where imbalance of at least one phase of the motor dissipates regeneration energy using windings of the motor. An exemplary closed loop control circuit of the present invention is illustrated in FIG. 4.

In FIG. 4 the exemplary closed loop motor control circuit 14 of the present invention performs washer 10 motor operations where imbalance of at least one phase of the motor dissipates regeneration energy using motor windings. Imbalance is performed by adjusting inverter 64 output frequency and/or amplitude of voltage 57 (also known as motor input frequency and amplitude of voltage 57) to the motor 12 on one or more phases. The control circuit outputs a signal to the inverter; the signal causes the inverter to adjust the frequency and/or amplitude of voltage to the motor 12 on one or more phases. The control circuit is important to adjusting inverter output. While single phase DC offset is used as an imbalance in an exemplary embodiment of the present invention, other types of imbalance can be used to dissipate regeneration energy in the winding of the motor. For example, frequency variation, or amplitude variation of one or more phases. One of ordinary skill in the art would understand how to perform imbalance in the motor using various motor voltage input adjustments.

In an exemplary embodiment of the present invention, the drive system is an Integrated Control 14 and Motor 12 (ICM). However, in other exemplary embodiments of the present invention a motor and separate control circuit may be used in place of the ICM as may be determined by one of ordinary skill in the art. One of ordinary skill in the art would understand that other parameters (for example current or torque) could be used for motor braking.

Motor Control

Figure 6:
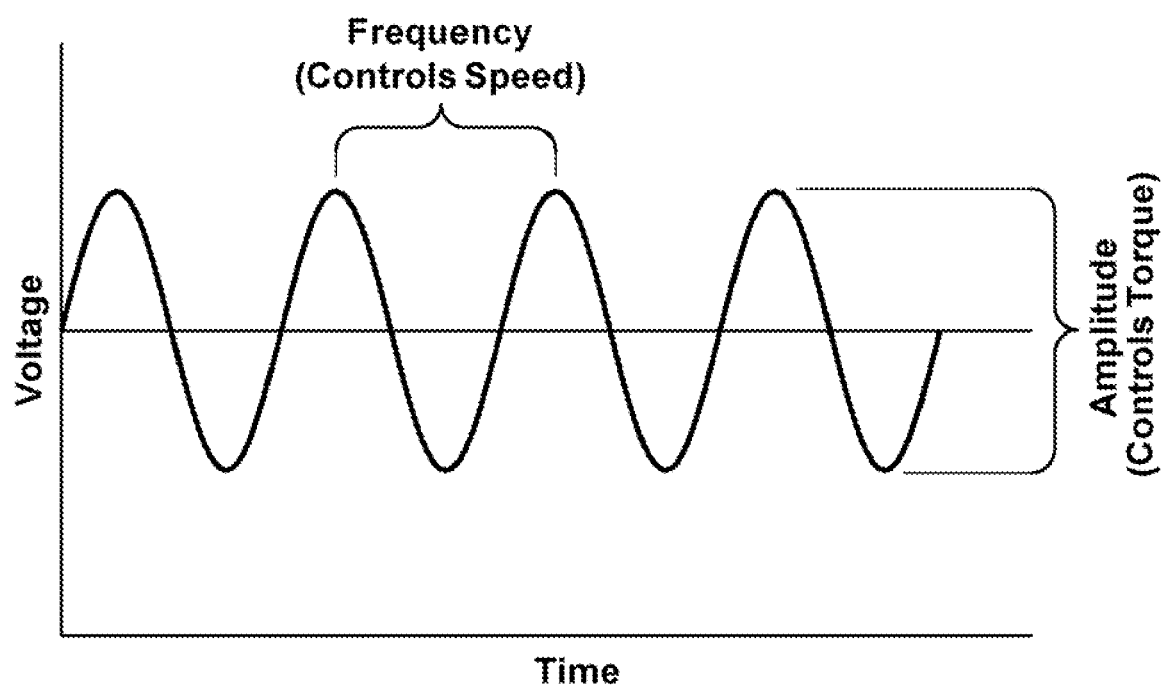
FIG. 6 is an exemplary graph illustrating the frequency and amplitude of input voltage to the motor.

Generally, the two-pole induction motor 12 is controlled by outputting an ac voltage from the inverter 64 and inputting the ac voltage to the motor 12, where the ac voltage can have a sine wave of a controlled, specific or predetermined frequency and/or amplitude. In driving mode the electrical speed of the motor is greater than the mechanical speed of the motor (i.e. positive slip). In braking mode, the electrical speed of the motor is less than the mechanical speed of the motor (i.e. negative slip). FIG. 6 is a graph illustrating the frequency and amplitude of input voltage to the motor 12.

Generation

Figure 7:
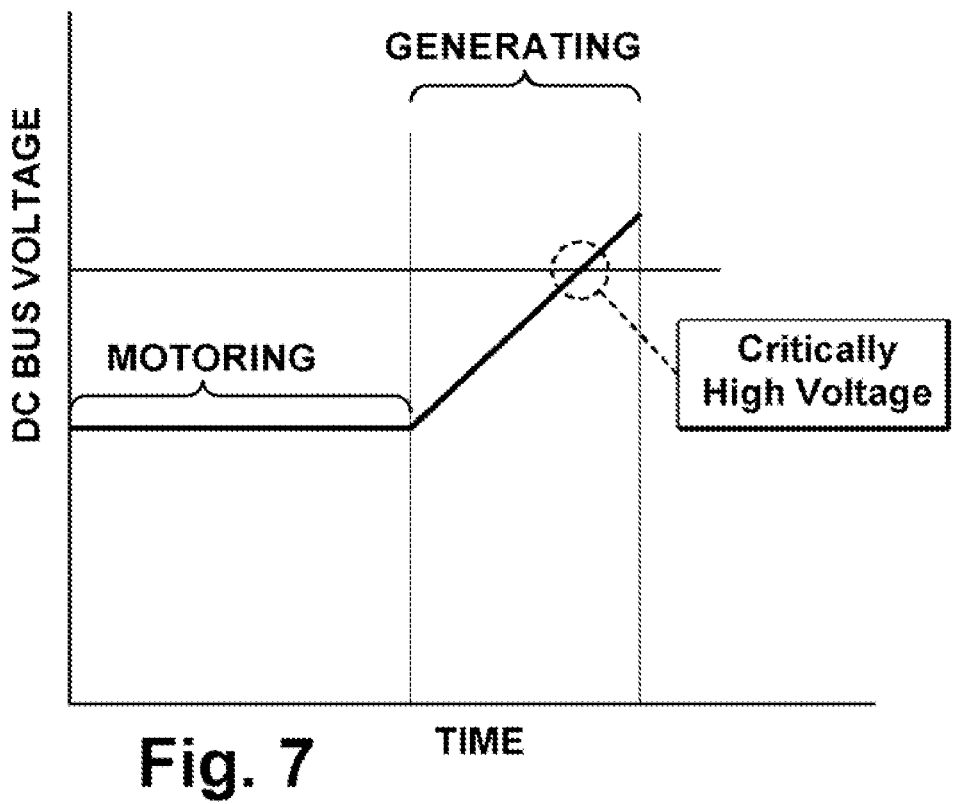
FIG. 7 is an exemplary graph illustrating DC bus voltage vs. time including a critically high DC bus voltage.
Figure 8:
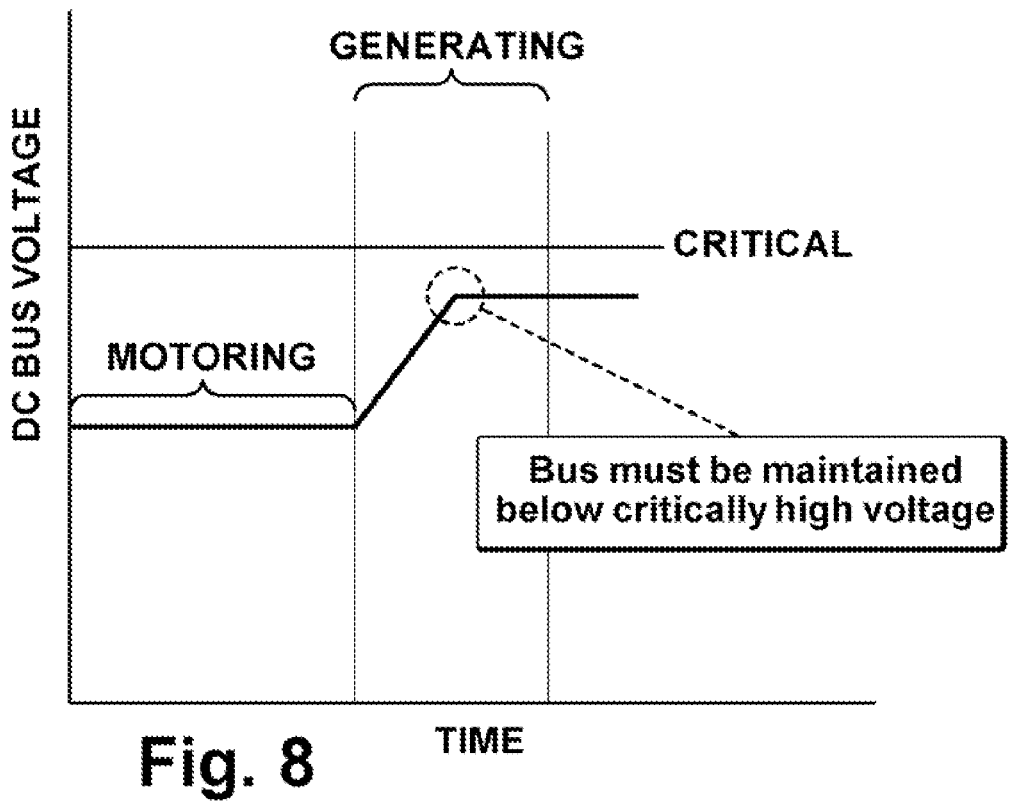
FIG. 8 is an exemplary graph illustrating DC bus voltage vs. time including a DC bus voltage below critically high DC bus voltage.

When operating at negative slip, the motor is generating and the DC bus voltage increases. In order to prevent damage to the inverter, the output voltage to the motor is adjusted to keep the DC Bus from reaching a predetermined critically high value. FIG. 7 is a graph illustrating DC bus voltage vs. time including a critically high DC bus voltage and FIG. 8 is a graph illustrating DC bus voltage vs. time including a DC bus voltage below critically high DC bus voltage.

Negative Slip Braking

An exemplary embodiment of the present invention includes the use of an induction motor. The induction motor is driven by a variable speed control, which together in the operation of a washing machine is called an integrated motor control (ICM) and motor herein. The controller or variable speed control of the washing machine brakes a washing machine load to substantially zero speed. The primary load of the system is inertial load. During braking of the washing machine tub, the induction motor produces torque that slows the speed of the driven load. The external inertia is defined as the inertia of the tub spinning including load articles. The total braking energy can be quantified in terms of the change in system kinetic energy of the washing machine tub driven by the motor and integrated control (ICM).

Typically, kinetic energy changes are made through use of a brake shoe or pad applied to the tub; a braking resistor controlled in a suitable manner may also be used to brake the system kinetic energy, either alone or in combination with the brake shoe. In an embodiment of the present invention, the kinetic energy is dissipated in the motor and/or motor control (together referred to as ICM). Braking or dissipating kinetic energy by the present embodiment of the invention may also be called using a deceleration torque. In an exemplary embodiment of the present invention energy from braking is dissipated in the motor windings. One of ordinary skill in the art can determine an appropriate dissipation of energy for braking.

The following describes an example of an embodiment of braking of the present invention. This example of the present invention, identified as deceleration torque, includes operation of the induction motor of the washing machine at a condition or mode called negative slip with phase unbalance.

A review of slip is helpful to understand the present deceleration torque example of the invention. In an induction motor, the rotor current causes a rotor magnetic field, which is spinning relative to the rotor at the slip frequency and relative to the stator magnetic field, at the same slip frequency. The interaction between rotor magnetic field and the stator magnetic field generates a torque in the rotor. A difference in speed between the stator field and the rotor field cause an induced current flow in the rotor. This difference in speed, or frequency, of the stator magnetic field and the rotor magnetic field is known as the slip. A positive slip produces positive torque and alternately a negative slip produces a negative torque. A rotor field rotating slower than the stator field constitutes operating in positive slip producing a positive torque. Alternately, a rotor field rotating faster than the stator field constitutes negative slip and produces negative decelerating torque.

Negative slip is used advantageously in the present deceleration torque exemplary invention. The usefulness is dependent upon the speed, measured typically in revolutions per minute (rpm). At a fast speed, i.e. about 500_to about 10,000 rpm or more, negative slip generates a large amount of negative torque. At a slow speed, i.e. about _500 rpm, which is a speed less than the fast speed; the large torque that is the result of the fast speed is not produced. The example speeds are a factor of the torque produced by the motor used and therefore vary by motor design or type of motor used.

A DC current $i_{dc}$ is produced and flows out of the induction motor and to a DC bus 55 that is part of the motor 12 and motor control circuit 14 at speeds between about 12000 and about 500 rpm and is dependent upon the motor being in negative slip mode.

(4) S1(slow), such as S1(500 rpm)

(5) S0(fast), such as S0(12,000 rpm)

Braking Method

Figure 5:
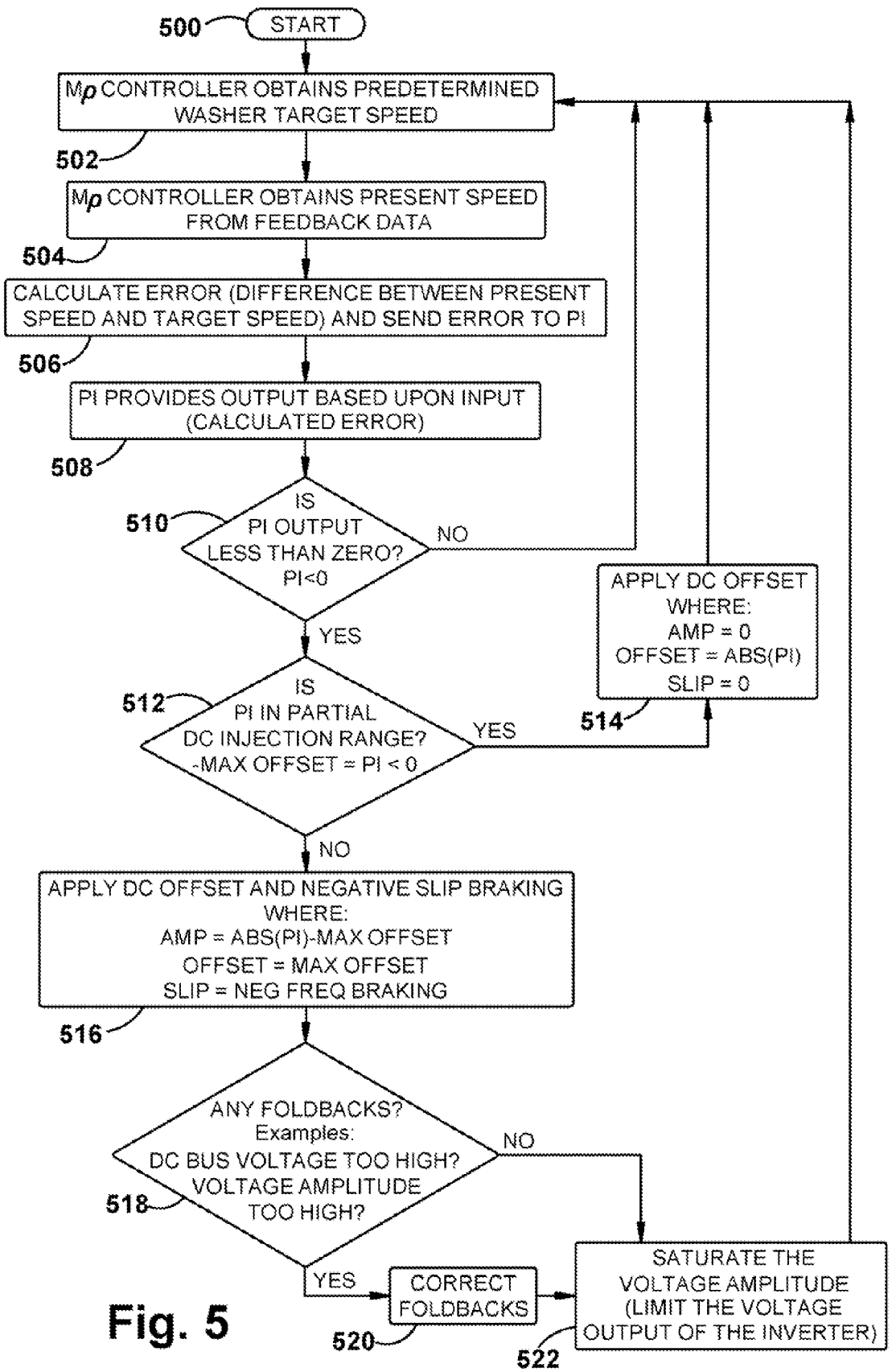
FIG. 5 illustrates an exemplary method of the present invention.

FIG. 5 is a flowchart of an exemplary embodiment of the present invention. At 500 the method begins. At 502 the microprocessor controller 61 obtains a predetermined washer target speed. The predetermined washer target speed Washer Speed$_{target}$ is a speed that corresponds to the individual washer based upon motor specifications, tub size and various factors that could be determined by one of ordinary skill in the art. The microprocessor controller 61 includes Proportional-Integral (PI) control 63. In the electrical block diagram of FIG. 4, amplitude of inverter 64 voltage output is controlled by PI 63. Input to the Proportional-Integral (PI) control 63 is amplified and output. The equation for PI output, where $K_p$ and $K_i$ are constants; is as follows:

$$\text{PI Output} = K_p * \text{Error} + \int (K_i * \text{Error}) \qquad (1)$$

Next at 504 the microprocessor controller 61 obtains a present operating speed Washer Speed$_{present}$ of the washer. At 506, an error calculation is performed using equation (2) below, and the error is input to the Proportional-Integral (PI) controller 63 of the microprocessor controller 61. The error calculation equation is:

$$\text{Error} = \text{Washer Speed}_{target} - \text{Washer Speed}_{present} \qquad (2)$$

Figure 12:
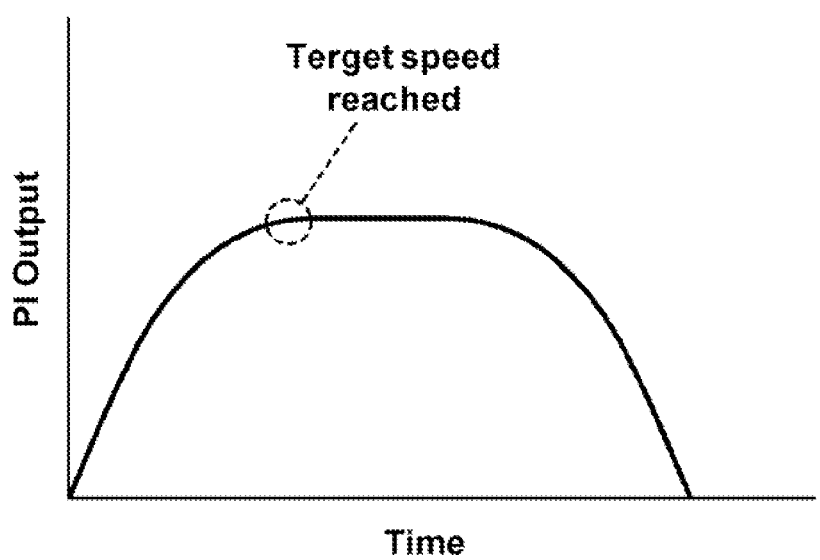
FIG. 12 is an exemplary graph of PI Output vs. time where target speed is illustrated at a PI stabilization plateau.

An exemplary method of the present invention uses the PI output. In the exemplary method of the present invention, PI control is used to control braking and is also used to determine when to implement DC Offset braking. One of ordinary skill in the art would understand that DC Offset may also be referred to as DC Injection; the terms are used herein interchangeably. The PI output can change (increase or decrease) until the washer target speed is reached. The PI stabilizes when washer target speed is reached. PI stabilization is illustrated in FIG. 12, a graph of PI output vs. time where target speed is illustrated at a PI stabilization plateau. At 508, the PI 63 outputs a value, referred to as PI Output, proportional to the error input of 506 above. Next, at 510 a query is made as to whether the PI output is less than zero; in equation form, the query is:

$$\text{PI Output} < 0 \qquad (3)$$

Figure 13:
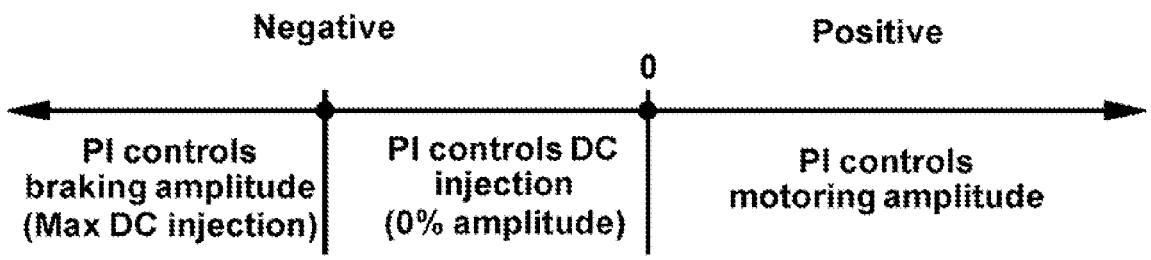
FIG. 13 is an exemplary graph of the magnitude of PI output illustrating various motor modes that the PI output influences as it moves along the continuum of negative to positive PI Output.

The microprocessor controller 61 includes PI control 63. The PI output is measured and the control system 14 responds based upon the output. When PI output is negative, then the PI controls DC Injection; When the PI controls DC Injection a substantially smooth transition occurs between motoring and DC injection. FIG. 13 is an exemplary graph of the magnitude of PI output illustrating various motor modes that the PI output influences as it moves along the continuum of negative to positive PI Output.

Returning to FIG. 5, if the answer to the query 510 is NO then the method returns to 502. If the answer to query 510 is YES, then a next query 512 is made to determine whether the PI Output is in partial DC Injection range. An equation form of the query 512 is:

−Maximum DC Offset<PI Output<0    (4)

Figure 10:
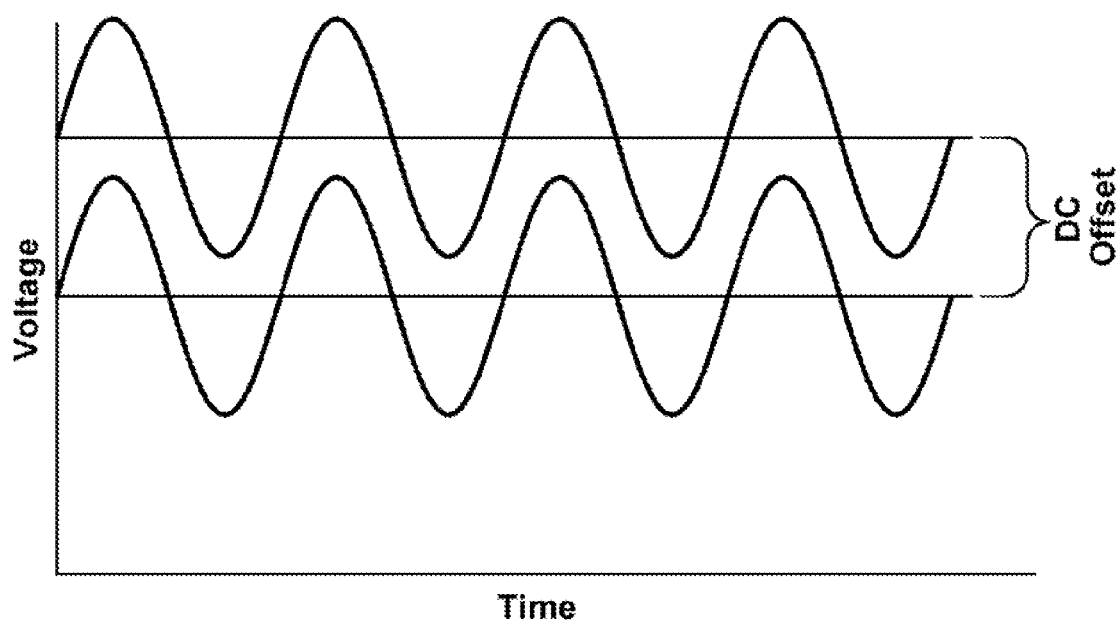
FIG. 10 is an exemplary graph of voltage vs. time where DC injection adds an offset to the sine wave(s) driving the motor.
Figure 14:
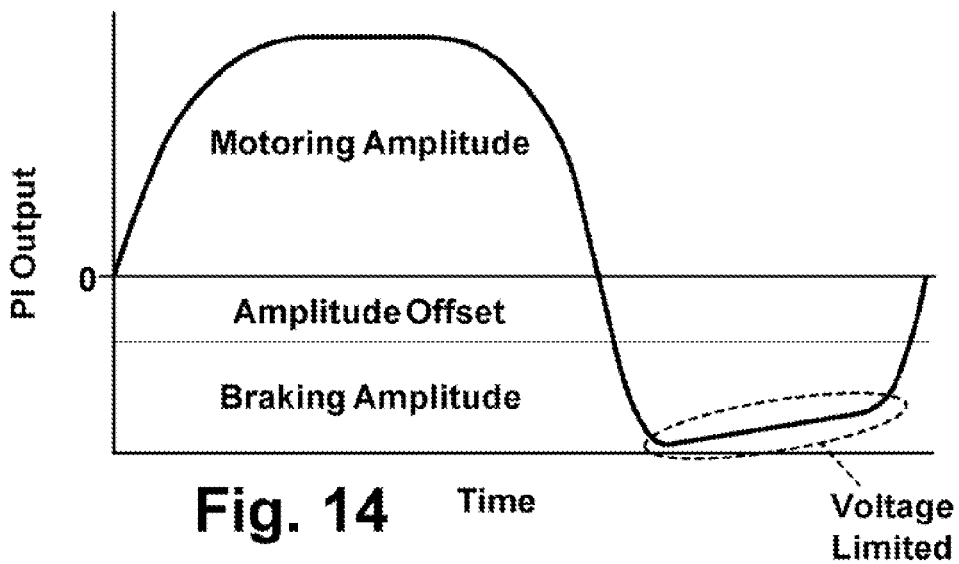
FIG. 14 is a graph of PI Output vs. Time and illustrates the PI Output of Table A corresponding to motor mode.

When PI output is greater than or equal to a predetermined maximum offset value then the PI controls the amplitude of the voltage input to the motor 12 for braking. FIG. 10 is a graph of PI output illustrating several ranges of PI output and various motor 12 operation modes corresponding to each output. Three motor 12 conditions, motoring amplitude, amplitude offset and braking amplitude, correspond to PI output illustrated in FIG. 14. Table A below includes PI Output and corresponding DC Offset, amplitude of input voltage to the motor and slip. FIG. 14 is a graph of PI Output vs. Time and illustrates the PI Output of Table A corresponding to motor 12 mode.

TABLE A

| PI Output | DC Offset | Amplitude | Slip |
|---|---|---|---|
| PI > 0 | 0 | PI Output | Positive slip based on slip table |
| −Max DC Offset ≦ PI < 0 | Abs (PI Output) | 0 | 0 |
| PI < −Max DC Offset | Max Offset | Abs (PI Output) −Max DC Offset | −5 Hz |

The flowchart of FIG. 5 further illustrates the above exemplary embodiment of the present invention. If the answer to the query 512 is YES then at 514 DC Offset parameters are provided so that the inverter 64 provides an input voltage to the motor 12 that causes the motor 12 to operate in DC Offset mode where −Max DC Offset≦PI<0. As can be read from the second data line of Table A, the exemplary parameters for DC Offset for this embodiment of the present invention are: :Voltage Amplitude=0; DC Offset=|PI Output|; and Slip=0. After 514, the method returns to operator 502 as explained above.

If the answer to the query 512 is NO then at 516 DC Offset and Negative Slip Braking parameters are provided so that the inverter 64 outputs an input voltage to the motor 12 that causes the motor 12 to operate in DC Offset and Negative Slip Braking modes where PI<−Max DC Offset. As can be read from the third data line of Table A, the exemplary parameters for DC Offset and Negative Slip Braking modes for this embodiment of the present invention are: Voltage Amplitude=|PI Output|−Max. DC Offset; DC Offset=max. DC Offset|; and Slip=Neg. Frequency Braking.

Figure 9:
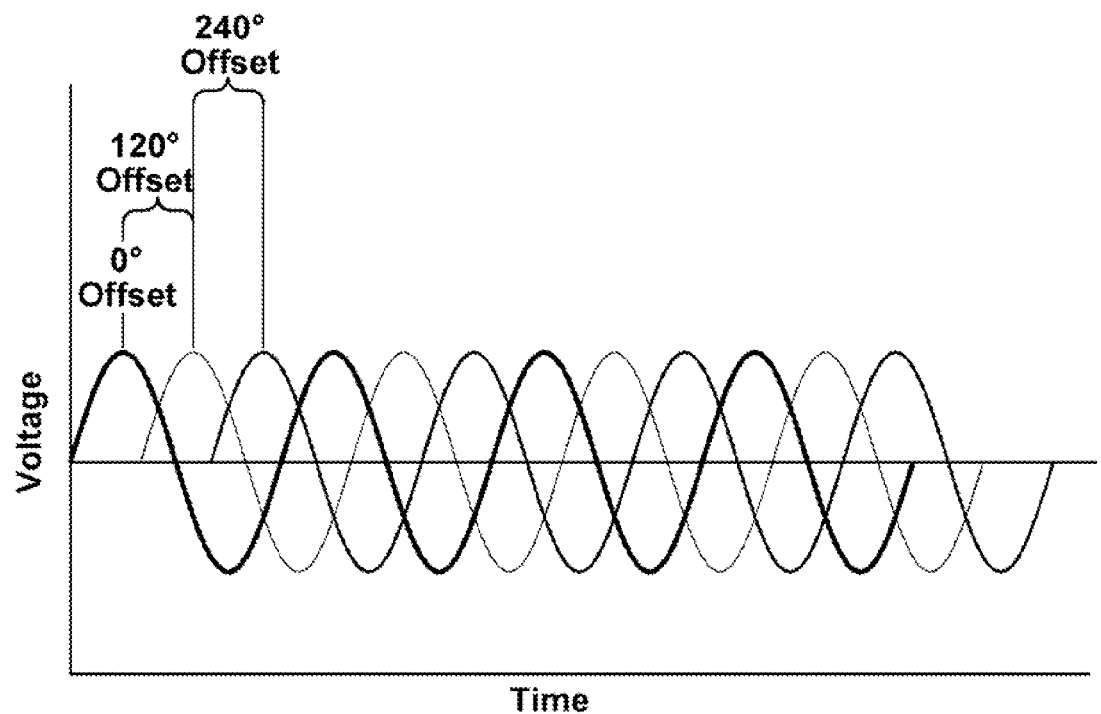
FIG. 9 is an exemplary graph of voltage vs. time where the 3 voltage phases are centered about the x-axis.

DC Offset/DC injection and Braking/Phase Imbalance. The microprocessor 61 drives the inverter 64 to convert the DC voltage into three-phase AC, typically by pulse-width modulation (PWM). A typical three-phase motor has phases that are offset by 120 degrees from each other. FIG. 9 is an exemplary graph of voltage vs. time where the 3 voltage phases are centered about the x-axis. DC injection adds an offset to the sine wave(s) driving the motor as is illustrated in the voltage vs. time graph of FIG. 10. Regarding phase imbalance, by injecting DC into only 1 phase, an imbalance of the phases is created as illustrated in the voltage vs. time graph of FIG. 11. When the imbalance occurs, the motor operates very inefficiently. This inefficiency is used to dissipate the extra energy generated by the motor during braking.

Negative Slip Braking. In an exemplary embodiment of the present invention braking is achieved by applying a value of negative slip to the windings. As energy is recovered and the DC bus voltage increases, a phase unbalance is created which dissipates the extra energy into the windings. This allows the motor to operate at substantially any value of negative slip. Moreover, removing negative slip and keeping the unbalance leads to DC injection, which is used to stop the motor at slow speeds. A detailed discussion of slip is provided above.

Negative slip braking is favorable at higher operating speeds, however it is not well suited to bring the load to a complete stop. As operation speeds approach zero the available braking torque diminishes. Hence, there is a need for current injection portion of this embodiment of the present invention. In this exemplary embodiment of the present invention, current injection is applied to one phase of the motor. With current injection, the DC power is applied to windings of the induction motor. This mode is implemented at low speeds to bring the load to zero angular velocity. During this current injection braking mode the energy of the load is dissipated in the motor. There is substantially no regeneration power supplied back to the control. For example, at about 500 rpm for an exemplary three-phase induction motor, the motor 12 of the present invention can operate in DC mode where DC voltage is input to the motor because the torque output at about 500 rpm motor speed or less, is greater when the motor 12 is operating on DC power than on AC power. The determination as to whether the motor input at the about 500 rpm or less, speed can be made by one of ordinary skill in the art.

Returning to FIG. 5, 518 follows 516, and a query is made at 518 as to whether any foldbacks should be made. A foldback generally is a reduction of current to a safe level when load currents exceed a maximum recommended value; the foldback protects the components of a circuit. In the present query, the use of foldbacks refers to adjustments to voltage and/or current. For example, in this exemplary embodiment of the present invention, the foldbacks may be DC bus voltage and/or amplitude of voltage input to the motor. If the answer to the query 518 is YES then at 520 correction of foldback(s) is performed. After 520, amplitude saturation is performed at 522.

Figure 16:
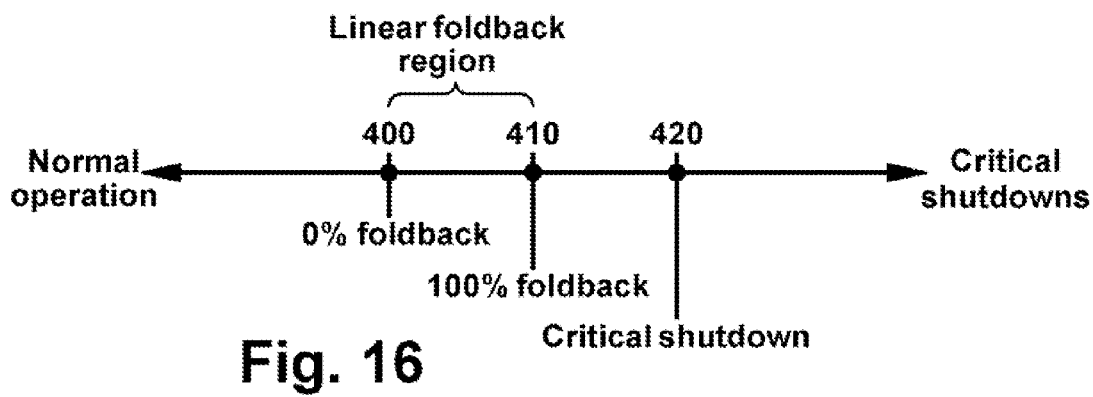
FIG. 16 is an exemplary plot of DC bus voltage illustrating a continuum of DC Bus voltage from normal operation on the left side of the plot and critical shutdown values on the right side of the plot.

DC bus foldbacks are further explained as follows. When the DC bus rises above a predefined maximum voltage, the amount of energy generated by the motor is then decreased. This decrease of generated energy is accomplished with a DC bus foldback, for example operator 520. FIG. 16 is an exemplary plot of DC bus voltage illustrating a continuum of DC Bus voltage from normal operation i.e. DC bus voltage values to the left side of the plot and critical shutdown, i.e. DC bus voltage values to the right side of the plot. The example plot is specific to a particular exemplary washer; one of ordinary skill in the art would understand that other DC bus voltage ranges may be represented in similar plots. The DC bus voltages illustrated in the exemplary FIG. 16 include a critical shutdown voltage of 420 Volts, a 100% foldback at 410 Volts and a 0% foldback at 400 Volts. Between 400 Volts and 410 Volts is a linear foldback region representing 0% to 100% foldback. Other voltages could be represented for various exemplary embodiments of the present invention as may be determined by one of ordinary skill in the art. The percent of foldback is determined using the following equation:

$$\text{Foldback \%} = \frac{\text{Actual DC Voltage} - 0\% \text{ Foldback Voltage}}{100\% \text{ Foldback Voltage} - 0\% \text{ Foldback Voltage}} \quad (5)$$

Adjusted amplitude of the equation below represents an amount the amplitude of the voltage output from the inverter 64 should be reduced in order to compensate for the foldback percentage.

$$\text{Adjusted Amplitude} = \text{Amplitude} * (100\% \text{ Foldback Voltage} - \text{Foldback \%}) \quad (6)$$

Returning to query 518, if the answer to the query 518 is NO then, next at 522 amplitude saturation is performed. Amplitude saturation of 522 refers to limiting the voltage output of the inverter (aka input voltage to motor 12) to a predetermined maximum voltage corresponding to a speed (Hz). The predetermined maximum output voltage is obtained by looking up maximum allowed voltage for the current driving frequency (Hz).

Figure 15:
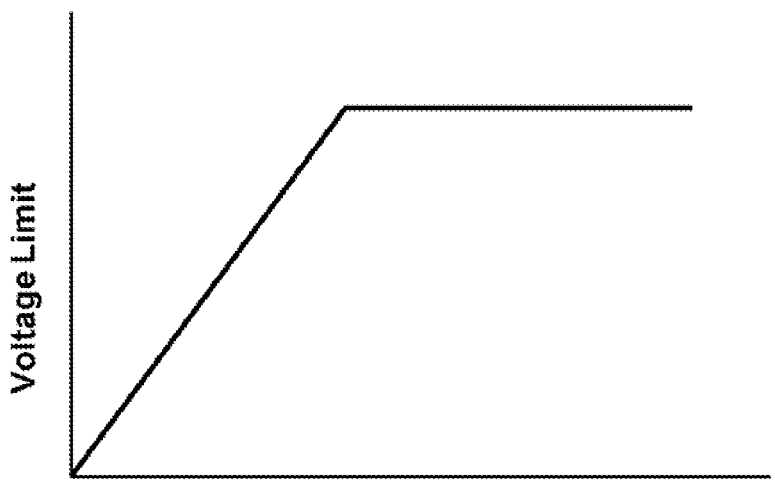
FIG. 15 is an exemplary graph of voltage vs. speed in Hertz (Hz) with voltage points corresponding to current from the motor control circuit.

Amplitude saturation is further described using current limiting. Current to the motor 12 can be limited by limiting voltage output of the inverter 64 to a predetermined Volts/Hz curve. The voltages plotted on the curve of FIG. 15, which is a graph of voltage vs. speed in Hertz (Hz), are voltage points corresponding to current from the motor control circuit 14. The vertical axis of the graph plateaus; at the plateau the graph represents voltage corresponding to a maximum current to the motor 12. Hence, the plateau portion of the curve represents the maximum output voltage of the inverter 64. The maximum output voltage of the inverter is substantially equivalent to the maximum input voltage to the motor 12 and is determined by motor 12 specifications under which the motor 12 can normally operate without failure of physical components. Returning to FIG. 14, it can be seen that motor speed is limited by the Volts/Hz during braking in order to limit the current. The speed limit is illustrated by the circled portion of the braking amplitude section of the graph, labeled "voltage limited."

Figure 17:
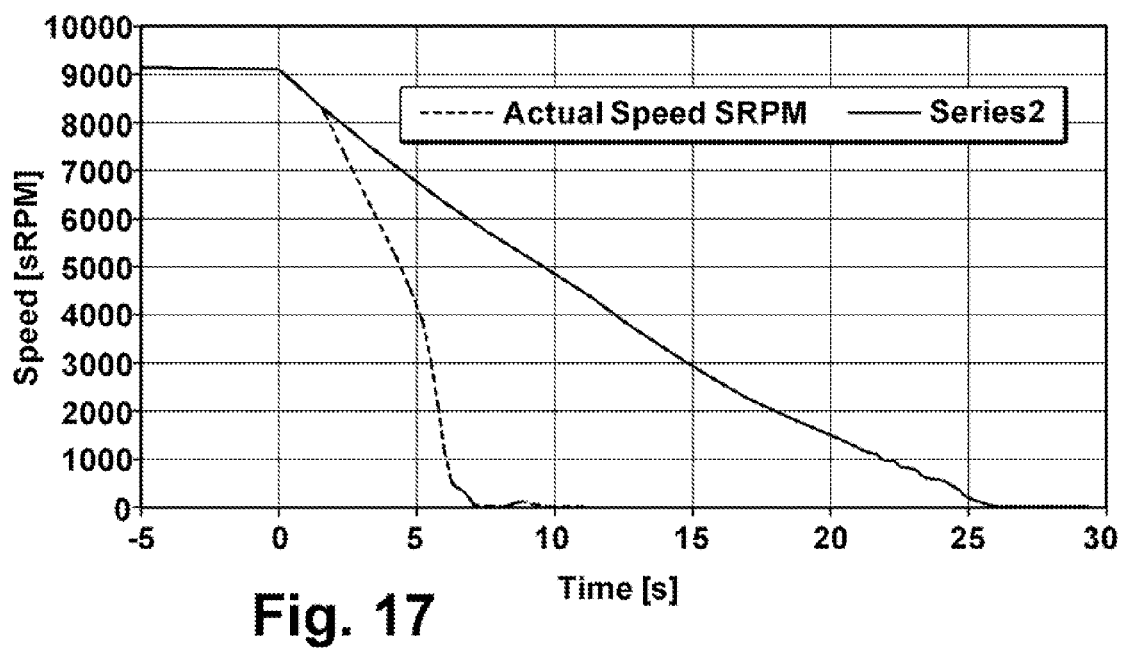
FIG. 17 is an exemplary graph illustrating speed vs. time for a 7 second braking of the washer and a 26 second coast to stop of the washer.

Braking Profile. The above described exemplary braking is performed to substantially meet a braking profile required for safety. With respect to the integrated motor control and motor (ICM), the induction motor that is used in the present invention has a braking profile that provides current from the induction motor that is within acceptable operating limits for components, such as electronic components, that comprise the motor control circuit. An example braking profile for an exemplary embodiment of the present invention is illustrated in FIG. 6. The braking profile or graph illustrates speed vs. time. At an initial speed, $S_{initial}$, braking begins and 7 seconds later at a stop time $S_{stop}$, the motor is stopped. The voltage and frequency to the motor 12 is adjusted over the course of the 7 seconds using the rotor 13 speed feedback 52 to the microprocessor 61 and the microprocessor output 53 to the inverter 64, which thereby causes appropriate deceleration of motor 12. Appropriate braking profiles can be determined by one of ordinary skill in the art and used with embodiments of the present invention. FIG. 17 is an exemplary graph illustrating speed vs. time for a 7 second braking of the washer and a 26 second coast to stop of the washer.

Another advantage of the embodiments of the present invention is that additional hardware is avoided and braking can be performed during substantially all negative slip. Another advantage is that input voltage from a power outlet is not used to brake or stop the motor while performing an embodiment of the present invention. Also, the present invention provides a cost effective design since it dissipates energy of the washing machine motor by avoiding the use of prior art elements such as brake shoes or pads or brake resistors. Brake pads and brake resistors add to the unit cost of a washing machine.

Figure 11:
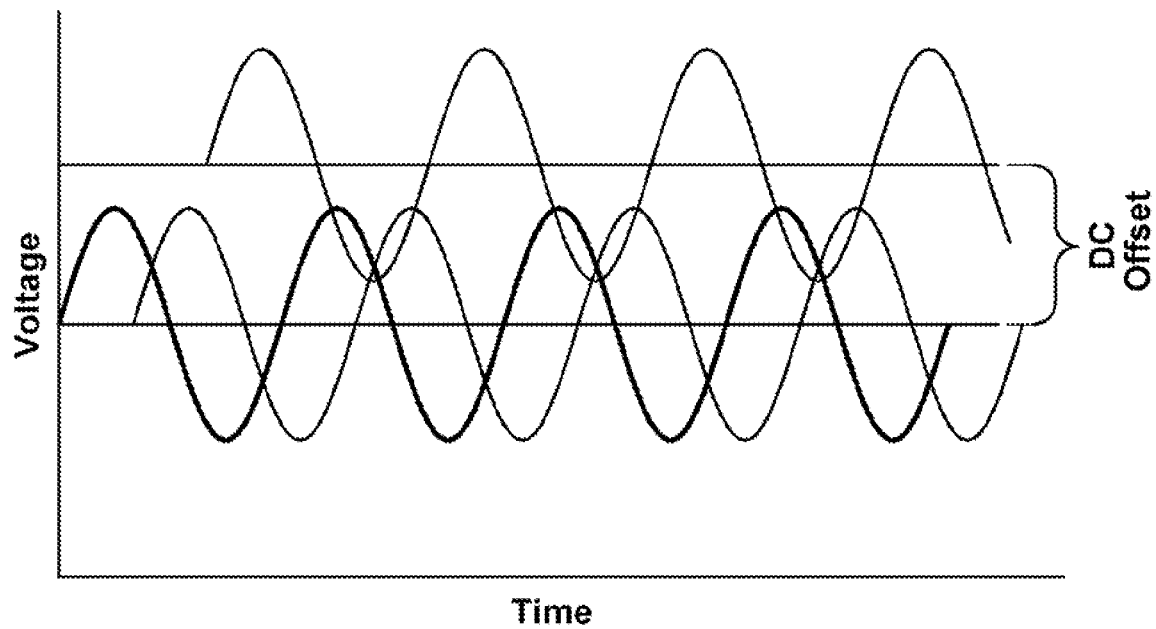
FIG. 11 illustrates an exemplary embodiment of a graph of voltage vs. time where phase imbalance dissipates the energy recovered from the load through operation in negative slip.

FIG. 11 illustrates an exemplary embodiment of a graph of voltage vs. time where phase imbalance dissipates the energy recovered from the load through operation in negative slip. This imbalances causes motor braking using a low negative slip. If the imbalance is insufficient and the DC bus voltage rises, then the amplitude of the voltage input to the motor is decreased, thereby causing decreased generation. Extra energy resulting from this action is dissipated in the windings due to the imbalance.

In these exemplary embodiments of the present invention the motor is an induction motor and the invention dissipates energy through the use of metal that is part of the induction motor that provides for the specified operation of the motor. Thus, the induction motor, among its various elements, comprises metal. The metal is available for use in the dissipation of energy Additionally, this invention allows the most cost effective system design, as it dissipates energy in the motor. The motor 12 includes a quantity of material or metal, for example, copper for windings, for actual motoring requirements. Thus, for example, the motor 12 includes a quantity of material such as copper or aluminum for windings (i.e. stator windings) in order for the motor to obtain the torque and speed of the motoring requirements. Because of concerns for the motor 12, such as longevity, a typical motor may run at less than its specified torque and speed so that stress on the motor is less than it would be if the motor was designed to the lesser predetermined torque and speed. Since extra copper capacity, beyond the capacity needed for the predetermined output torque and speed, is available due to the actual motor requirements used in the design, there is an amount of free material, such as aluminum of this example, available for dissipation of braking energy. The above actual requirement of 125% is used as an example only and the actual motor requirements, the specified motoring requirements and the free material can be determined by one of ordinary skill in the art. Duty cycle for braking is much less than duty cycle when motor is running so that the motoring requirements upon which excess energy is put, are within acceptable ranges. Hence, the actual energy transferred is less than the energy that is transferred in motoring requirements.

The exemplary embodiments of the present invention use variable speed induction motors. Additionally, control circuits and methods used therewith are tuned to minimize the amount of energy dissipated in the electronic control, which among other advantages, also minimizes product cost.

In addition to the accomplishment discussed above, this exemplary embodiment of the present invention accomplishes braking through the adjustment of output voltage and frequency of a single phase of the three-phase output of the inverter. This phase imbalance is input to the motor 12 and causes the motor 12 and operatively attached washer tub 24 speeds to reach substantially zero speed within a predetermined time limit.

The aforementioned embodiments of the present invention use an exemplary motor platform that is an AC induction motor. In an alternate embodiment of the present invention a different motor platform that is not an AC Induction motor may be used. One of ordinary skill in the art could determine an appropriate motor platform for the present invention.

It should also be noted that the terms "first", "second", "third", "upper", "lower", and the like may be used herein to modify various elements. These modifiers do not imply a spatial, sequential, or hierarchical order to the modified elements unless specifically stated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a motor, the method comprising:
   operating the motor at an operating speed;
   calculating a percent error that corresponds to a difference between the operating speed and a predetermined target speed;
   inputting the percent error to a proportional integral (PI) controller of the rotatably supported basket, the proportional integral controller comprising a PI input and a PI output;
   braking the rotatably supported basket using at least one braking mode determined using the PI output;
   determining the PI output to be negative; and if so
   creating an imbalance in the three-phase motor by applying a DC offset to one or more phases until a predetermined maximum DC offset is achieved while operating with substantially zero slip; and
   determining that the DC offset has reached the predetermined maximum DC offset value, and if so,
   operating the motor in a negative slip mode and adjusting amplitude as needed to achieve the desired slower operating speed.

2. The method of claim 1, wherein the motor comprises a three-phase motor and a rotatably supported basket operatively connected to the motor, the method further comprising accelerating the rotatably supported basket to the operating speed.

3. A method of braking a washing machine, the method comprising: a)
   providing a motor feedback control circuit, configured to be operatively coupled to the motor;
   the motor feedback control circuit comprising a microprocessor and an inverter, the
   microprocessor comprising a proportional integral controller, the microprocessor configured to receive an operating speed from the motor feedback control circuit and to provide voltage output instructions to the inverter;
   the proportional integral controller comprising an input and an output, the microprocessor providing an input value to the PI input, the PI output outputting an output value to the microprocessor for a determination of at least one braking operation; and
   the inverter configured to the receive voltage output instruction from the microprocessor and provide voltage output to the motor power input according to the voltage output instructions and cause the motor to operate in the at least one braking operation determined by the microprocessor from the output value of the proportional integral controller;

b) determining that the output value is less than zero, and if so c) instructing the inverter with the microprocessor to provide one or more phases of the power input of the motor with a DC offset value until a predetermined maximum DC offset is achieved while operating at zero slip; and d) determining that the predetermined maximum DC offset is achieved, and if so;

e) instructing the inverter with the microprocessor to operate the motor in negative slip mode and to increase the voltage amplitude of the power input to the motor.

4. The method of claim 3 wherein the output value is a difference between the operating speed of the motor and a predetermined target speed of the motor.

5. The method of claim 3 further comprising:
   a) providing, a DC bus voltage value and a zero percent foldback DC bus voltage value, to the microprocessor,
   b) calculating a percent foldback using the microprocessor and a difference between the DC bus voltage value and the zero percent foldback DC bus voltage value; and
   c) adjusting the voltage amplitude of the three phase power input based on the calculated percent foldback and the DC offset value to maintain the DC bus voltage substantially within a predetermined range.

6. A computer program product comprising: a program storage device readable by a circuit interrupter, tangibly embodying a program of instructions executable by the circuit interrupter to perform a method of braking an AC motor, the method comprising:
   a) accelerating the motor to an operating speed;
   b) calculating a percent error that corresponds to a difference between the operating speed and a predetermined target speed;
   c) inputting the percent error to a proportional integral (PI) controller of the motor, the proportional integral controller comprising a PI input and a PI output; and
   d) braking the motor using at least one braking mode determined using the PI output;
   e) determining that the PI output is negative, and if so creating an imbalance with the inverter in the three-phase motor by applying a DC offset to one or more phases of the motor until a predetermined maximum DC offset is achieved while operating with substantially zero slip; and
   f) determining that the DC offset has reached the predetermined maximum DC offset value, and if so, operating the motor in negative slip mode.

7. The method of claim 6 wherein the percent error is determined using a difference between the operating speed of the motor and the predetermined target speed of the motor.

* * * * *